(12) United States Patent
Sakurai

(10) Patent No.: US 10,840,816 B2
(45) Date of Patent: Nov. 17, 2020

(54) VOLTAGE CONVERSION DEVICE

(71) Applicant: HONDA MOTOR CO., LTD., Tokyo (JP)

(72) Inventor: Takeshi Sakurai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/558,450

(22) Filed: Sep. 3, 2019

(65) Prior Publication Data

US 2020/0076319 A1 Mar. 5, 2020

(30) Foreign Application Priority Data

Sep. 5, 2018 (JP) ................. 2018-165950

(51) Int. Cl.
*H02M 3/335* (2006.01)
(52) U.S. Cl.
CPC ... *H02M 3/33592* (2013.01); *H02M 3/33507* (2013.01)

(58) Field of Classification Search
None
See application file for complete search history.

(56) References Cited

U.S. PATENT DOCUMENTS

| 9,257,913 | B1 * | 2/2016 | McDonald | H02M 3/33569 |
| 2016/0294296 | A1 * | 10/2016 | Lee | H02M 1/4258 |
| 2017/0025965 | A1 * | 1/2017 | Ramabhadran | H02M 3/33592 |
| 2018/0041108 | A1 | 2/2018 | Tanaka | |
| 2019/0081572 | A1 * | 3/2019 | Hatano | H02M 3/33507 |

FOREIGN PATENT DOCUMENTS

| JP | 2018-019578 | 2/2018 |
| WO | 2016139745 | 9/2016 |

* cited by examiner

*Primary Examiner* — Jeffrey A Gblende
(74) *Attorney, Agent, or Firm* — Amin, Turocy & Watson, LLP

(57) ABSTRACT

A voltage conversion device includes: a transformer including a primary coil provided on a primary side with a relatively high voltage and a secondary coil provided on a secondary side with a relatively low voltage; and a current sensor provided on the primary side. The inductance of the current sensor is used as an inductance component of a resonant circuit on the primary side.

5 Claims, 9 Drawing Sheets

VOLTAGE CONVERSION DEVICE

BACKGROUND

Technical Field

The present invention relates to a voltage conversion device. Priority is claimed on Japanese Patent Application No. 2018-165950, filed Sep. 5, 2018, the contents of which are incorporated herein by reference.

Background Art

Conventionally, an insulation type DC-DC converter using an excitation inductance of a transformer as an inductance component for current resonance on the primary side of the transformer is known (see, for example, Japanese Unexamined Patent Application, First Publication No. 2018-019578).

Also, conventionally, an insulation type DC-DC converter using a leakage inductance of a transformer as an inductance component for current resonance on the primary side of the transformer is known (see, for example, PCT International Publication No. WO 2016/139745).

In the insulation type DC-DC converter according to the prior art described above, when using the excitation inductance of the transformer as the inductance component for current resonance, it is necessary to additionally provide an excitation inductor in the primary side resonance circuit, which causes a problem that the size of the DC-DC converter is increased.

Further, in the insulation type DC-DC converter according to the prior art described above, when the leakage inductance of the transformer is used as the inductance component for current resonance, the inductor cross-sectional area or the number of turns required to prevent the magnetic saturation is increased as the current capacity (that is, the passing current) increases, which may cause an increase in size of the DC-DC converter.

This invention is made in view of the above-described situation, and it aims at providing the voltage conversion device which can limit the enlargement of a structure.

SUMMARY (1) A voltage conversion device (for example, the DC-DC converter 30 in the embodiment) includes: a transformer (for example, the transformer 65 in the embodiment) including a primary coil (for example, the primary coil 65a in the embodiment) provided on a primary side with a relatively high voltage and a secondary coil (for example, the secondary coil 65b in the embodiment) provided on a secondary side with a relatively low voltage; and a current sensor (for example, the current transformer 64 in the embodiment) provided on the primary side, wherein an inductance (for example, the inductance Lct in the embodiment) of the current sensor is used as an inductance component of a resonant circuit (for example, the series resonant circuit 69 in the embodiment) on the primary side.

(2) In the voltage conversion device according to (1), the inductance (for example, the leakage inductance Lt in the embodiment) of the current sensor and a leakage inductance of the transformer may be used as the inductance component.

(3) The voltage conversion device according to (1) or (2) may include an inductor (for example, the excitation inductor 71 in the embodiment) provided on the primary side, and at least the inductance (for example, the excitation inductance Lm in the embodiment) of the current sensor and an inductance of the inductor may be used as the inductance component.

(4) The voltage conversion device according to any one of (1) to (3) may include a rectifying diode (for example, the first diode 66 and the second diode 67 in the embodiment) provided on the secondary side.

(5) The voltage conversion device according to (4) may include a switching element (for example, the first rectification transistor 72 and the second rectification transistor 73 in the embodiment) for synchronous rectification provided on the secondary side.

According to the above (1), since the inductance of the current sensor provided in advance on the primary side is used as the inductance component of the resonant circuit, for example, compared to the case where a new inductor is provided for resonance, the enlargement of the voltage conversion device can be limited.

Further, for example, compared with the case where only the leakage inductance of the transformer is used as the inductance component of the resonance circuit, the inductance component can be set to be in a wider range, and by increasing the resonance frequency, the increase in the inductor cross-sectional area and the number of turns can be limited, and the increase in size of the voltage conversion device can be limited.

In the case of the above (2), the inductance component of the resonant circuit can be set to be in a wider range, and can be appropriately coped with in the wider primary side input voltage range, improving the versatility of the voltage conversion device.

In the case of the above (3), the inductance component can be set to be in a wider range by additionally providing an inductor in the resonance circuit on the primary side.

In the case of the above (4), the rectification can be properly performed while limiting the increase of the cost required for the device configuration.

In the case of the above (5), for example, compared to the case where a rectifying diode is provided, rectification can be performed with higher accuracy, and a stable output voltage can be maintained with lower loss.

DETAILED DESCRIPTION OF THE PREFERRED EMBODIMENTS

Hereinafter, an embodiment of a voltage conversion device of the present invention will be described with reference to the attached drawings.

The voltage conversion device according to the present embodiment is, for example, a DC-DC converter connected to a power module that controls power exchange between the motor and the first battery, and that controls the step-down of the voltage of the first battery with respect to the second battery. For example, the voltage conversion device and the power module are mounted on an electrically driven vehicle or the like. The electrically driven vehicle is an electric vehicle, a hybrid vehicle, a fuel cell vehicle, and the like. The electric vehicle is powered by a battery. The hybrid vehicle is driven by a battery and an internal combustion engine as a power source. The fuel cell vehicle is driven by a fuel cell as a power source.

(Vehicle)

Figure 1:
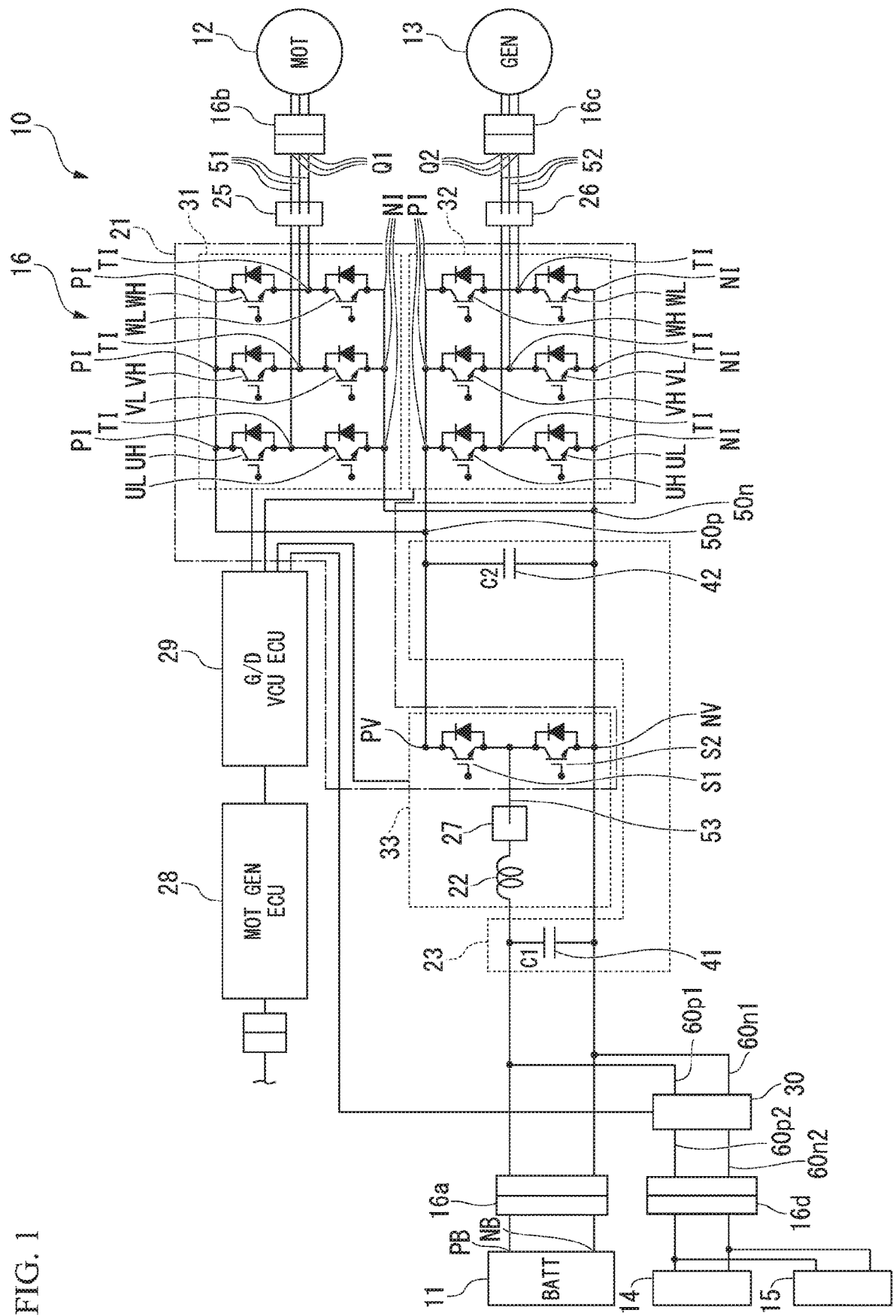
FIG. 1 is a view showing a part of the configuration of a vehicle equipped with a DC-DC converter according to an embodiment of the present invention.

FIG. 1 is a view showing a part of the configuration of a vehicle 10 equipped with a DC-DC converter 30 according to an embodiment of the present invention.

As shown in FIG. 1, the vehicle 10 includes a first battery 11 (BATT), a first motor 12 (MOT) for driving, a second motor 13 (GEN) for power generation, a second battery 14, an accessory 15, and a power conversion device 16.

The first battery 11 is, for example, a high voltage battery which is a power source of the vehicle 10. The first battery 11 includes a battery case and a plurality of battery modules housed in the battery case. The battery module includes a plurality of battery cells connected in series. The first battery 11 includes a positive electrode terminal PB and a negative electrode terminal NB connected to the first DC connector 16a of the power conversion device 16. The positive electrode terminal PB and the negative electrode terminal NB are connected to the positive electrode end and the negative electrode end of a plurality of battery modules connected in series in the battery case.

The first motor 12 generates a rotational driving force (powering operation) by the power supplied from the first battery 11. The second motor 13 generates generated power by the rotational driving force input to the rotational shaft. Here, the rotational power of the internal combustion engine can be transmitted to the second motor 13. For example, each of the first motor 12 and the second motor 13 is a three-phase alternating current brushless DC motor. Three phases are U phase, V phase, and W phase.

Each of the first motor 12 and the second motor 13 is an inner rotor type. Each of the motors 12 and 13 includes a rotor having a permanent magnet for field and a stator having a three-phase stator winding for generating a rotating magnetic field for rotating the rotor. The three-phase stator winding of the first motor 12 is connected to the first three-phase connector 16b of the power conversion device 16. The three-phase stator winding of the second motor 13 is connected to the second three-phase connector 16c of the power conversion device 16.

The second battery 14 is, for example, a low voltage battery that drives accessories such as vehicle-mounted devices of the vehicle 10. The second battery 14 is connected to the first battery 11 via the DC-DC converter 30 of the power conversion device 16. The second battery 14 is applied with a voltage output from the DC-DC converter 30, that is, a voltage obtained by stepping down the output voltage of the first battery 11.

The accessories 15 are driven by the voltage output from the second battery 14, that is, the operating voltage of the accessories 15. The accessories 15 are, for example, various electric devices and the like.

(Power Conversion Device)

The power conversion device 16 includes a power module 21, a reactor 22, a capacitor unit 23, a first current sensor 25, a second current sensor 26, a third current sensor 27, an electronic control unit 28 (MOT GEN ECU), a gate drive unit 29 (G/D VCU ECU), and a DC-DC converter 30.

The power module 21 configures a first power conversion circuit unit 31, a second power conversion circuit unit 32, and a third power conversion circuit unit 33. The first power conversion circuit unit 31 is connected to the three-phase stator winding of the first motor 12 by the first three-phase connector 16b. The first power conversion circuit unit 31 converts direct current power input from the first battery 11 via the third power conversion circuit unit 33 into three-phase alternating current power. The second power conversion circuit unit 32 is connected to the three-phase stator winding of the second motor 13 by the second three-phase connector 16c. The second power conversion circuit unit 32 converts three-phase AC power input from the second motor 13 into DC power. The direct current power converted by the second power conversion circuit unit 32 can be supplied to at least one of the first battery 11 and the first power conversion circuit unit 31.

Each of the first power conversion circuit unit 31 and the second power conversion circuit unit 32 includes a bridge circuit formed by a plurality of bridge-connected switching elements. For example, the switching element is a transistor such as an IGBT (Insulated Gate Bipolar Transistor) or a MOSFET (Metal Oxide Semi-Conductor Field Effect Transistor). For example, in the bridge circuit, a pair of high side arm and low side arm U phase transistors UH and UL, a pair of high side arm and low side arm V phase transistors VH and VL, and a pair of high side arm and low side arm W-phase transistors WH and WL are respectively bridge-connected.

The bridge circuit includes a diode connected in a forward direction from the emitter to the collector between the collector and the emitter of each of the transistors UH, UL, VH, VL, WH, and WL.

The collectors of the transistors UH, VH, WH of the high side arm are connected to the positive electrode bus bar PI to constitute the high side arm. In each phase, each positive electrode bus bar PI of the high side arm is connected to the positive electrode bus bar 50p of the capacitor unit 23.

Emitters of the transistors UL, VL, and WL of the low side arm are connected to the negative bus bar NI to form a low side arm. In each phase, each negative bus bar NI of the low side arm is connected to the negative bus bar 50n of the capacitor unit 23.

In each phase, the emitters of the transistors UH, VH and WH of the high side arm are connected to the collectors of the transistors UL, VL and WL of the low side arm at the connection point TI.

The first bus bar 51 forming the connection point TI in each phase of the first power conversion circuit unit 31 is connected to the first input/output terminal Q1. The first input/output terminal Q1 is connected to the first three-phase connector 16b. The connection point TI of each phase of the first power conversion circuit unit 31 is connected to a stator winding of each phase of the first motor 12 through the first bus bar 51, the first input/output terminal Q1, and the first three-phase connector 16b.

The second bus bar 52 forming the connection point TI in each phase of the second power conversion circuit unit 32 is connected to the second input/output terminal Q2. The second input/output terminal Q2 is connected to the second three-phase connector 16c. The connection point TI of each phase of the second power conversion circuit unit 32 is connected to a stator winding of each phase of the second motor 13 through the second bus bar 52, the second input/output terminal Q2, and the second three-phase connector 16c.

Each of the first power conversion circuit unit 31 and the second power conversion circuit unit 32 switches on (conductive)/off (break) of the transistor pair of each phase, based on a gate signal which is a switching command input from the gate drive unit 29 to the gate of each transistor UH, VH, WH, UL, VL, and WL.

The first power conversion circuit unit 31 converts DC power input from the first battery 11 through the third power conversion circuit unit 33 into three-phase AC power, and applies alternating U-phase current, V phase current, and W phase current to the three-phase stator windings by sequentially commutating the three-phase stator windings of the first motor 12.

The second power conversion circuit unit 32 converts the three-phase AC power output from the three-phase stator winding of the second motor 13 into the DC power by on (conductive)/off (break) driving of the transistor pairs of respective phases synchronized with the rotation of the second motor 13. The DC power converted from the three-phase AC power by the second power conversion circuit unit 32 can be supplied to the battery 11 via the third power conversion circuit unit 33.

The third power conversion circuit unit 33 is a voltage control unit (VCU). The third power conversion circuit unit 33 includes switching elements of a high side arm and a low side arm forming a pair, and a reactor 22. For example, the third power conversion circuit unit 33 includes a first transistor S1 of the high side arm and a second transistor S2 of the low side arm. The third power conversion circuit unit 33 includes a diode connected in the forward direction from the emitter to the collector between the collector and the emitter of each of the first transistor S1 and the second transistor S2.

The collector of the first transistor S1 is connected to the positive bus bar PV to constitute a high side arm. The positive bus bar PV of the high side arm is connected to the positive bus bar 50p of the capacitor unit 23.

The emitter of the second transistor S2 is connected to the negative bus bar NV to form a low side arm. The negative bus bar NV of the low side arm is connected to the negative bus bar 50n of the capacitor unit 23. The negative bus bar 50n of the capacitor unit 23 is connected to the negative terminal NB of the first battery 11.

The emitter of the first transistor S1 of the high side arm is connected to the collector of the second transistor S2 of the low side arm. A connection point of the emitter of the first transistor S1 and the collector of the second transistor S2 is formed by the third bus bar 53. The third bus bar 53 is connected to the positive electrode terminal PB of the first battery 11 via the reactor 22.

Both ends of the reactor 22 are connected to the third bus bar 53 forming a connection point of the first transistor S1 and the second transistor S2 and the positive electrode terminal PB of the first battery 11. The reactor 22 includes a coil and a temperature sensor that detects the temperature of the coil. The temperature sensor is connected to the electronic control unit 28 by a signal line.

The third power conversion circuit unit 33 switches on (conductive)/off (break) of the transistor pair based on a gate signal which is a switching command input from the gate drive unit 29 to the gate of each of the first transistor S1 and the second transistor S2.

The third power conversion circuit unit 33 alternately switches during boosting between a first state in which the second transistor S2 is on (conductive) and the first transistor S1 is off (break) and a second state in which the second transistor S2 is off (break) and the first transistor S1 is on (conductive).

In the first state, current flows sequentially to the positive electrode terminal PB of the first battery 11, the reactor 22, the second transistor S2, and the negative electrode terminal NB of the first battery 11, and the reactor 22 is DC excited to accumulate magnetic energy.

In the second state, an electromotive voltage (induction voltage) is generated between both ends of the reactor 22 so as to prevent a change in magnetic flux caused by interruption of the current flowing through the reactor 22. The induction voltage due to the magnetic energy stored in the reactor 22 is superimposed on the battery voltage, and a boosted voltage higher than the voltage between the terminals of the first battery 11 is applied between the positive bus bar PV and the negative bus bar NV of the third power conversion circuit unit 33.

The third power conversion circuit unit 33 alternately switches between the second state and the first state during regeneration.

In the second state, current flows sequentially to the positive bus bar PV of the third power conversion circuit unit 33, the first transistor S1, the reactor 22, and the positive terminal PB of the first battery 11, and the reactor 22 is DC excited to accumulate magnetic energy.

In the first state, an electromotive voltage (induction voltage) is generated between both ends of the reactor 22 so as to prevent a change in magnetic flux caused by interruption of the current flowing through the reactor 22. The induction voltage by the magnetic energy stored in the reactor 22 is stepped down, and the stepped-down voltage lower than the voltage between the positive bus bar PV and the negative bus bar NV of the third power conversion circuit unit 33 is applied between the positive terminal PB and the negative terminal NB of the first battery 11.

The capacitor unit 23 includes a first smoothing capacitor 41 and a second smoothing capacitor 42.

The first smoothing capacitor 41 is connected between the positive electrode terminal PB and the negative electrode terminal NB of the first battery 11. The first smoothing capacitor 41 smoothes the voltage fluctuation generated with the on/off switching operation of the first transistor S1 and the second transistor S2 at the time of regeneration of the third power conversion circuit unit 33.

The second smoothing capacitor 42 is connected between the positive electrode bus bar PI and the negative electrode bus bar NI of each of the first power conversion circuit unit 31 and the second power conversion circuit unit 32, and between the positive electrode bus bar PV and the negative electrode bus bar NV of the third power conversion circuit unit 33. The second smoothing capacitor 42 is connected to the plurality of positive electrode bus bars PI and negative electrode bus bars NI, and the positive electrode bus bars PV and negative electrode bus bars NV via the positive electrode bus bars 50$p$ and the negative electrode bus bars 50$n$. The second smoothing capacitor 42 smooths voltage fluctuations generated along with the on/off switching operation of each of the transistors UH, UL, VH, VL, WH, and WL of the first power conversion circuit unit 31 and the second power conversion circuit unit 32. The second smoothing capacitor 42 smooths the voltage fluctuation generated with the on/off switching operation of the first transistor S1 and the second transistor S2 at the time of boosting of the third power conversion circuit unit 33.

The first current sensor 25 is disposed in the first bus bar 51 which forms a connection point TI of each phase of the first power conversion circuit unit 31 and is connected to the first input/output terminal Q1, and detects the current of each of the U phase, the V phase, and the W phase.

The second current sensor 26 is disposed in the second bus bar 52 which forms a connection point TI of each phase of the second power conversion circuit unit 32 and is connected to the second input/output terminal Q2, and detects current of each of the U phase, the V phase, and the W phase.

The third current sensor 27 is disposed in the third bus bar 53 which forms a connection point of the first transistor S1 and the second transistor S2 and is connected to the reactor 22, and detects a current flowing in the reactor 22.

Each of the first current sensor 25, the second current sensor 26, and the third current sensor 27 is connected to the electronic control unit 28 by a signal line.

The electronic control unit 28 controls the operation of each of the first motor 12 and the second motor 13. For example, the electronic control unit 28 is a software function unit that functions by execution of a predetermined program by a processor such as a CPU (Central Processing Unit). The software function unit is an ECU (Electronic Control Unit) including a processor such as a CPU, a ROM (Read Only Memory) for storing a program, a RAM (Random Access Memory) for temporarily storing data, and an electronic circuit such as a timer. Note that at least a part of the electronic control unit 28 may be an integrated circuit such as LSI (Large Scale Integration).

For example, the electronic control unit 28 executes feedback control or the like of current using the current detection value of the first current sensor 25 and the current target value according to the torque command value for the first motor 12, and generates a control signal to be input to the gate drive unit 29.

For example, the electronic control unit 28 executes feedback control or the like of the current using the current detection value of the second current sensor 26 and the current target value according to the regeneration command value for the second motor 13, and generates a control signal to be input to the gate drive unit 29.

The control signal is a signal indicating the timing for driving each of the transistors UH, VH, WH, UL, VL, and WL of the first power conversion circuit unit 31 and the second power conversion circuit unit 32 on (conductive)/off (break). For example, the control signal is a pulse width modulated signal or the like.

The gate drive unit 29 generates gate signals for actually driving each of the transistors UH, VH, WH, UL, VL, and WL of the first power conversion circuit unit 31 and the second power conversion circuit unit 32 on (conductive)/off (break), based on the control signal received from the electronic control unit 28. For example, the gate drive unit 29 performs amplification, level shift and the like of the control signal to generate a gate signal.

The gate drive unit 29 generates a gate signal for driving each of the first transistor S1 and the second transistor S2 of the third power conversion circuit unit 33 on (conductive)/off (break).

For example, the gate drive unit 29 generates a gate signal of a duty ratio according to the boosted voltage command at the time of boosting of the third power conversion circuit unit 33 or the stepped-down voltage command at the time of regeneration of the third power conversion circuit unit 33. The duty ratio is, for example, a ratio of on time of each of the first transistor S1 and the second transistor S2.

(Dc-Dc Converter)

Figure 2:
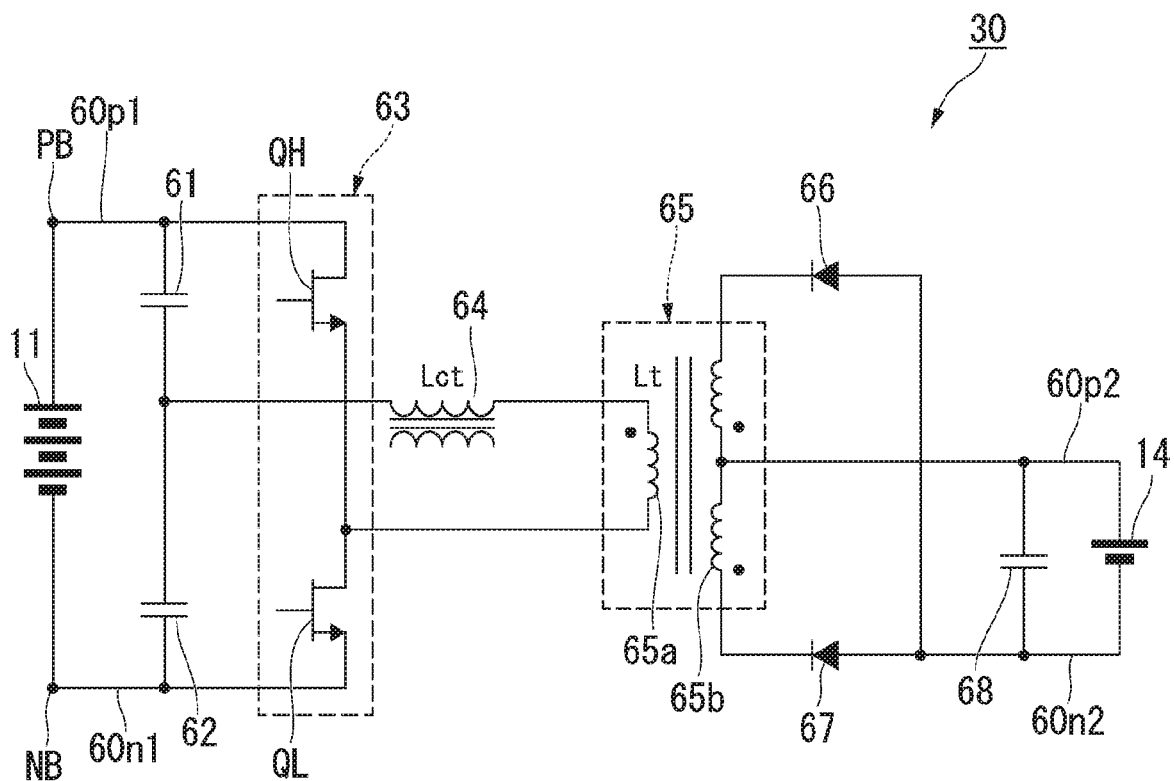
FIG. 2 is a diagram showing a configuration of a DC-DC converter according to an embodiment of the present invention.

FIG. 2 is a diagram showing the configuration of the DC-DC converter 30 according to the embodiment of the present invention.

The DC-DC converter 30 is controlled by the electronic control unit 28.

As shown in FIGS. 1 and 2, the DC-DC converter 30 includes a first positive bus bar 60$p$1 and a first negative bus bar 60$n$1 connected to the positive electrode terminal PB and the negative electrode terminal NB of the first battery 11 via the first DC connector 16$a$. The DC-DC converter 30 includes a second positive bus bar 60$p$2 and a second negative bus bar 60$n$2 connected to the positive electrode terminal and the negative electrode terminal of the second battery 14 via the second DC connector 16$d$.

The DC-DC converter 30 includes a first input capacitor 61 and a second input capacitor 62, a bridge circuit 63, a current transformer 64, a transformer 65, a first diode 66 and a second diode 67, and an output capacitor 68.

The first input capacitor 61 and the second input capacitor 62 are connected in series between the first positive bus bar 60$p$1 and the first negative bus bar 60$n$1. The connection point of the first input capacitor 61 and the second input capacitor 62 is connected to the current transformer 64.

The bridge circuit 63 is a so-called half bridge circuit, and includes switching elements of a high side arm and a low side arm forming a pair. The switching element is, for example, a transistor such as a MOSFET. For example, the bridge circuit 63 includes transistors QH and QL of a high side arm and a low side arm.

The drain of the transistor QH of the high side arm is connected to the first positive bus bar 60$p$1. The source of the high side arm transistor QH is connected to the drain of the low side arm transistor QL. The source of the transistor QL in the low side arm is connected to the first negative bus bar 60$n$1.

The connection point between the source of the transistor QH of the high side arm and the drain of the transistor QL of the low side arm in the bridge circuit 63 is connected to the first end of the primary coil 65$a$ of the transformer 65. The bridge circuit 63 converts direct current power applied between the first positive electrode bus bar 60$p$1 and the first negative electrode bus bar 60$n$1 into alternating current power, and causes an alternating current to be supplied to the primary coil 65a by sequentially commutating the supply of current to the primary coil 65a of the transformer 65.

The current transformer 64 is a current transformer for current detection. For example, the penetrable current transformer 64 includes a hollow ring core, a primary side conductor connected in series to a line through which a current to be measured flows and penetrating the ring core, a secondary side coil wound around the ring core, and a load resistor connected to the secondary side coil. The primary conductor of the current transformer 64 is connected between the connection point of the first input capacitor 61 and the second input capacitor 62 and the second end of the primary coil 65a of the transformer 65. The current transformer 64 generates, in the load resistance, a voltage proportional to the input alternating current flowing to the primary side conductor.

The current transformer 64 detects the droop current for the over-current state on the secondary side (that is, low voltage output side) from the current of the primary side (that is, high voltage input side), related to the over-current protection of the DC-DC converter 30, for example.

Figure 3:
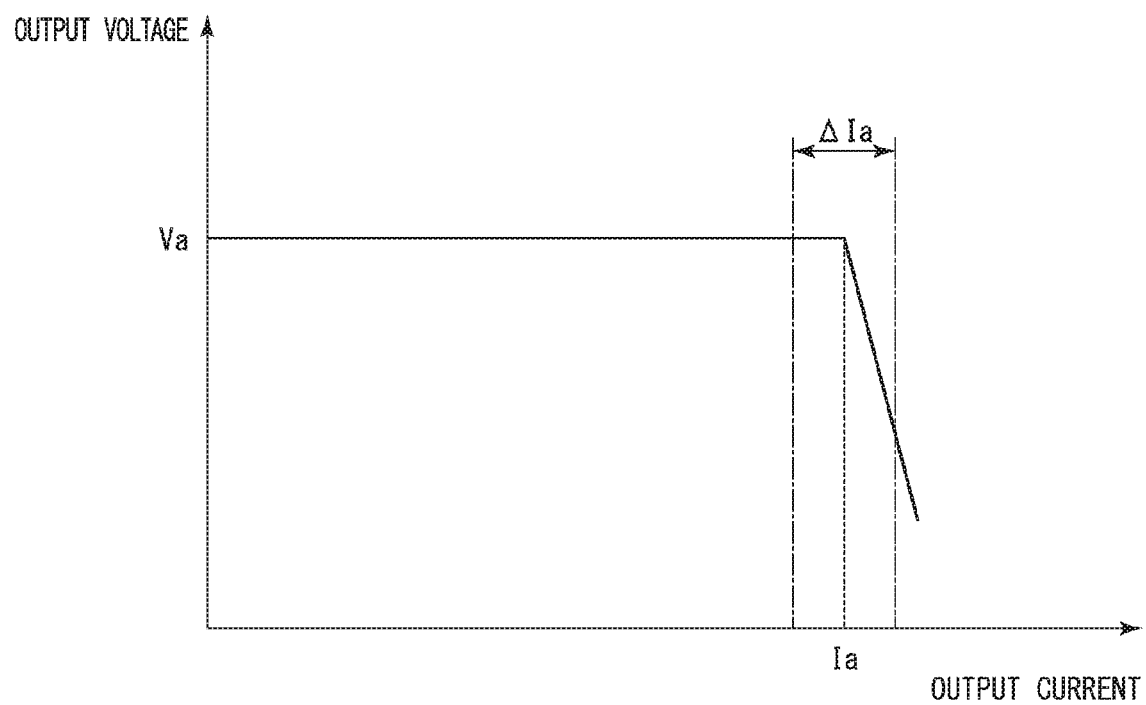
FIG. 3 is a view showing an example of a drooping characteristic of the DC-DC converter according to the embodiment of the present invention.

FIG. 3 is a view showing an example of the drooping characteristic of the DC-DC converter 30 according to the embodiment of the present invention.

As shown in FIG. 3, the drooping characteristic of DC-DC converter 30 reduces (droops) the output voltage while maintaining the output current, for example, within a predetermined current range ΔIa including a predetermined overcurrent detection value Ia for the output current on the secondary side (that is, the low voltage output side). In the over-current protection of the DC-DC converter 30, the electronic control unit 28 detects an overcurrent condition (droop point) of the output current, based on the primary side current (ie, high voltage input side) voltage-converted by the current transformer 64, ie, the primary side current proportional to the output current, and controls the switching of each transistor QH and QL so as to lower (droop) the output voltage.

The transformer 65 includes a primary coil 65a and a secondary coil 65b.

The first end of the primary coil 65a is connected to the connection point of the transistors QH and QL of the high side arm and the low side arm of the bridge circuit 63. The second end of the primary coil 65a is connected to the connection point of the first input capacitor 61 and the second input capacitor 62 via the current transformer 64.

The secondary coil 65b is connected between the cathode of the first diode 66 and the cathode of the second diode 67. An intermediate tap of the secondary coil 65b is connected to the second positive bus bar 60p2.

The transformer 65 generates an induced electromotive force in the secondary coil 65b by the AC power of the primary coil 65a, and reduces the voltage applied to the primary coil 65a to generate an induction voltage in the secondary coil 65b.

The first diode 66 and the second diode 67 rectify the induced electromotive force of the secondary coil 65b of the transformer 65. The anodes of the first diode 66 and the second diode 67 are connected to the second negative bus bar 60n2.

The output capacitor 68 is connected between the second positive bus bar 60p2 and the second negative bus bar 60n2. The output capacitor 68 smooths the output voltage to the second battery 14.

The DC-DC converter 30 according to the present embodiment has the above configuration, and the operation of the DC-DC converter 30 will be described next.

Figure 4:
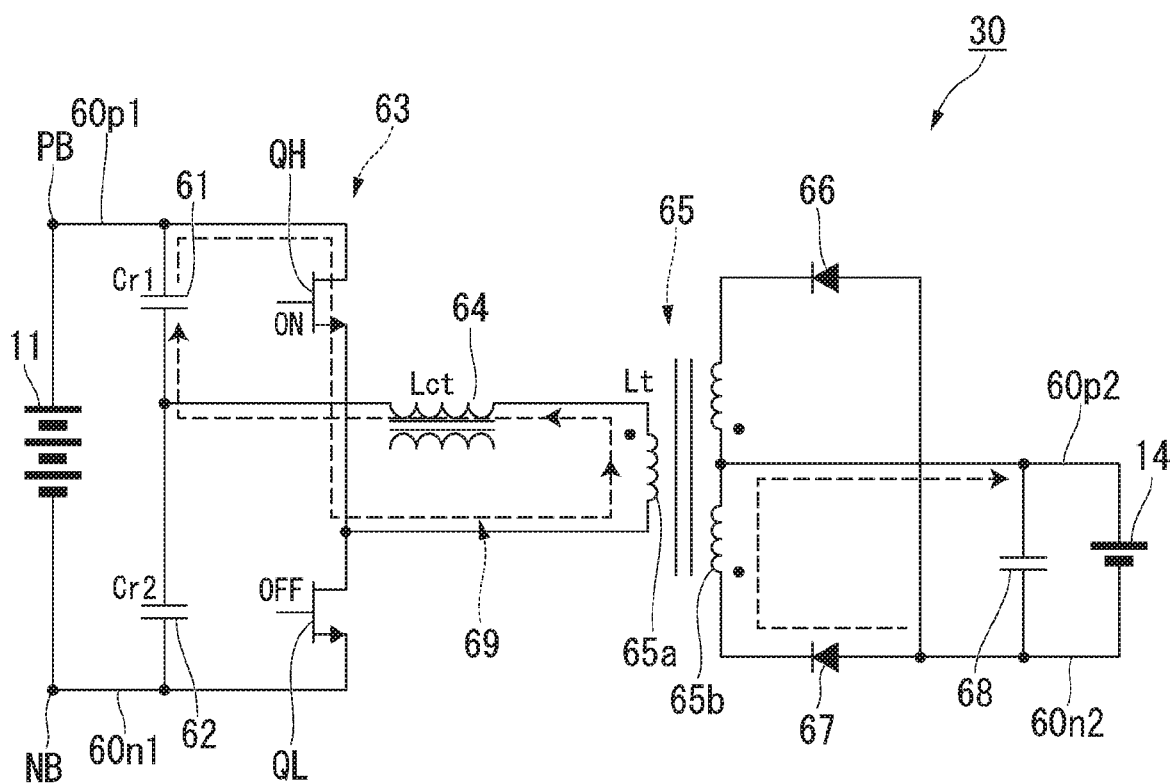
FIG. 4 is a diagram showing an example of the flow of each current on the primary side and the secondary side when the transistor of the high side arm is on in the DC-DC converter according to the embodiment of the present invention.
Figure 5:
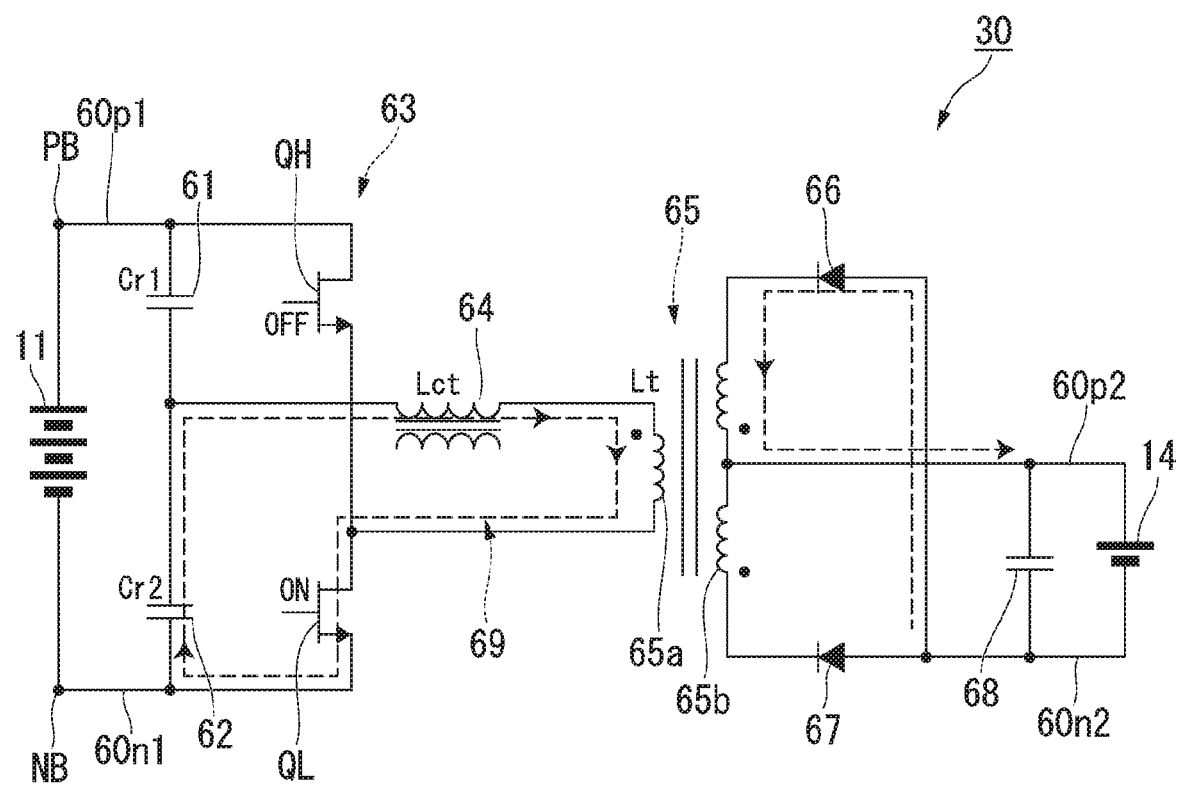
FIG. 5 is a view showing an example of the flow of each current on the primary side and the secondary side when the transistor of the low side arm is ON in the DC-DC converter according to the embodiment of the present invention.

FIG. 4 is a diagram showing an example of the flow of each current on the primary side and the secondary side when the transistor QH of the high side arm is on in the DC-DC converter 30 according to the embodiment of the present invention. FIG. 5 is a diagram showing an example of the flow of each current on the primary side and the secondary side when the transistor QL of the low side arm is on in the DC-DC converter 30 according to the embodiment of the present invention.

The DC-DC converter 30 operates as a so-called LLC current resonance type converter. The plurality of inductance components for resonance (LL) are, for example, the inductance Lct of the current transformer 64 and the leakage inductance Lt of the transformer 65. The capacitance component (C) for resonance is, for example, the capacitance Cr1 of the first input capacitor 61 and the capacitance Cr2 of the second input capacitor 62. The DC-DC converter 30 controls the output voltage by the resonant current flowing a series resonant circuit 69 formed by the respective capacitances Cr1 and Cr2 of the first and second input capacitors 61 and 62, the inductance Lct of the current transformer 64, and the leakage inductance Lt of the transformer 65.

The DC-DC converter 30 switches on (conductive)/off (break) to the transistor pair, based on a gate signal which is a switching command input from the gate drive unit 29 to the gates of the transistors QH and QL of the high side arm and the low side arm of the bridge circuit 63.

As shown in FIGS. 4 and 5, in the DC-DC converter 30, a first state in which the transistor QH in the high side arm is set to on (conductive) and the transistor QL in the low side arm is set to off (break) and a second state in which the transistor QH is set to off (break) and the transistor QL is set to on (conductive) are alternately switched. Thereby, the battery voltage VB which is the input voltage on the primary side is stepped down, and the output voltage on the secondary side is applied to the second battery 14.

As shown in FIG. 4, in the first state, on the primary side, the resonant current flows sequentially to the positive terminal of the first input capacitor 61, the transistor QH of the high side arm, the primary coil 65a of the transformer 65, the current transformer 64, and the negative terminal of the first input capacitor 61. On the secondary side, the current flows sequentially to the second diode 67, the secondary coil 65b, and the intermediate tap.

Immediately after the transistor QH in the high side arm is switched to off (break) from the first state, for example, a current in the negative direction flows through the body diode of the transistor QL in the low side arm on the primary side. The transistor QL in the low side arm is switched to on (conductive) when current in the negative direction flows in the body diode, and eventually the current flowing in the low side arm shifts from the negative direction to the positive direction.

As shown in FIG. 5, in the second state, on the primary side, the resonant current flows sequentially to the positive terminal of the second input capacitor 62, the current transformer 64, the primary coil 65a of the transformer 65, the transistor QL of the low side arm, and the negative terminal of the second input capacitor 62. On the secondary side, the current flows sequentially to the second diode 67, the secondary coil 65b, and the intermediate tap.

Immediately after the transistor QL in the low side arm is switched to off (break) from the second state, the current in the negative direction flows through the body diode of the transistor QH in the high side arm on the primary side. The transistor QH in the high side arm is switched to on (conductive) while current in the negative direction flows in the body diode, and eventually the current flowing in the high side arm shifts from the negative direction to the positive direction.

The electronic control unit 28 uses, for example, a resonance frequency Fs described by the capacitances Cr1 and Cr2, the inductance Lct of the current transformer 64, and the leakage inductance Lt of the transformer 65, as shown in the following equation (1), and controls switching of on (conductive)/off (break) of each transistor QH and QL of the bridge circuit 63. Equation (1) below includes the resonance frequency Fs (QH) on the side of the transistor QH of the high side arm and the resonance frequency Fs (QL) on the side of the transistor QL of the low side arm.

(Equation 1)

$$Fs(QH) = \frac{1}{2\pi\sqrt{\{(Lct+Lt) \times Cr1\}}} \\ Fs(QL) = \frac{1}{2\pi\sqrt{\{(Lct+Lt) \times Cr2\}}} \quad (1)$$

As described above, according to the DC-DC converter 30 of this embodiment, since the inductance Lct of the current transformer 64 provided on the primary side is used as the inductance component of the resonant circuit, for example, compared with the case where a new inductor is provided for resonance, it is possible to limit the upsizing of the DC-DC converter 30.

Further, for example, compared with the case where only the leakage inductance Lt of the transformer 65 is used as the inductance component of the resonance circuit, the inductance component can be set to be in a wider range, the increase of the inductor cross section and the number of turns is limited by increasing the resonance frequency, and the size of the DC-DC converter 30 can be limited.

For example, as shown in the following equation (2), the change in magnetic flux density AB of the transformer 65 is described by the switching frequency F, the cross section A and the winding ratio N of the transformer 65, the input voltage Vin, and the on-time Ton of each of the transistors QH and QL. According to the following equation (2), when the magnetic flux density change AB is constant, the cross-sectional area A and the winding ratio N of the transformer 65 are reduced by increasing the switching frequency F, and it is possible to miniaturize the transformer 65.

(Equation 2)

$$\Delta B = \frac{Vin \times Ton}{\sqrt{(2\pi \times F \times A \times N)}} \quad (2)$$

Further, for example, when only the leakage inductance Lt of the transformer 65 is used as the inductance component of the resonance circuit, the winding ratio between the input and the output of the DC-DC converter 30 is limited, so that the input voltage range is relatively restricted to a narrow range. As a result, for example, compared to a power supply having a substantially constant input voltage such as a server power supply, there is a problem that it is difficult to appropriately cope with a power supply whose input voltage range becomes relatively large by the regeneration and charging repeated with relatively large fluctuations, as in the high-voltage first battery 11 mounted on the vehicle 10.

To cope with such a problem, by using the inductance Lct of the current transformer 64 and the leakage inductance Lt of the transformer 65 as the inductance component of the resonant circuit, a relatively wide range of input voltage range can be accommodated, an output suitable for various vehicles 10 can be achieved, and the versatility of the DC-DC converter 30 can be improved.

Hereinafter, modifications of the embodiment will be described.

Although the DC-DC converter 30 operates as a so-called LLC current resonance type converter in the embodiment described above, the present invention is not limited to this. The DC-DC converter 30 may operate as a current resonance type converter using at least the inductance Lct of the current transformer 64 for resonance.

The DC-DC converter 30 according to the first modification of the embodiment described above operates as a so-called LC current resonance type converter. The inductance component (L) for resonance is the inductance Lct of the current transformer 64. The capacitance component (C) for resonance is the capacitance Cr1 of the first input capacitor 61 and the capacitance Cr2 of the second input capacitor 62.

The DC-DC converter 30 of the first modification control the output voltage by the resonant current flowing in a series resonant circuit formed by the respective capacitances Cr1 and Cr2 of the first and second input capacitors 61 and 62 and the inductance Lct of the current transformer 64.

The electronic control unit 28 uses the resonance frequency Fs described by the capacitances Cr1 and Cr2 and the inductance Lct of the current transformer 64, for example, as shown in the following equation (3), and controls switching of on (conductive)/off (break) of each transistor QH and QL of the bridge circuit 63. Equation (3) below includes the resonance frequency Fs (QH) on the side of the transistor QH of the high side arm and the resonance frequency Fs (QL) on the side of the transistor QL of the low side arm.

(Equation 3)

$$Fs(QH) = \frac{1}{2\pi\sqrt{(Lct \times Cr1)}} \\ Fs(QL) = \frac{1}{2\pi\sqrt{(Lct \times Cr2)}} \quad (3)$$

According to the first modification, for example, compared with the case where the leakage inductance Lt of transformer 65 is used as an inductance component of the resonant circuit, it is possible to limit an increase in the inductor cross-sectional area and the number of turns required to prevent magnetic saturation as the current capacity (i.e., the passing current) in the transformer 65 increases, and it is possible to limit the increase in size of the DC-DC converter 30.

In the embodiment and the first modification described above, the DC-DC converter 30 includes the inductance Lct of the current transformer 64 as an inductance component for resonance, but it is not limited to this, and may further include an excitation inductance Lm.

Figure 6:
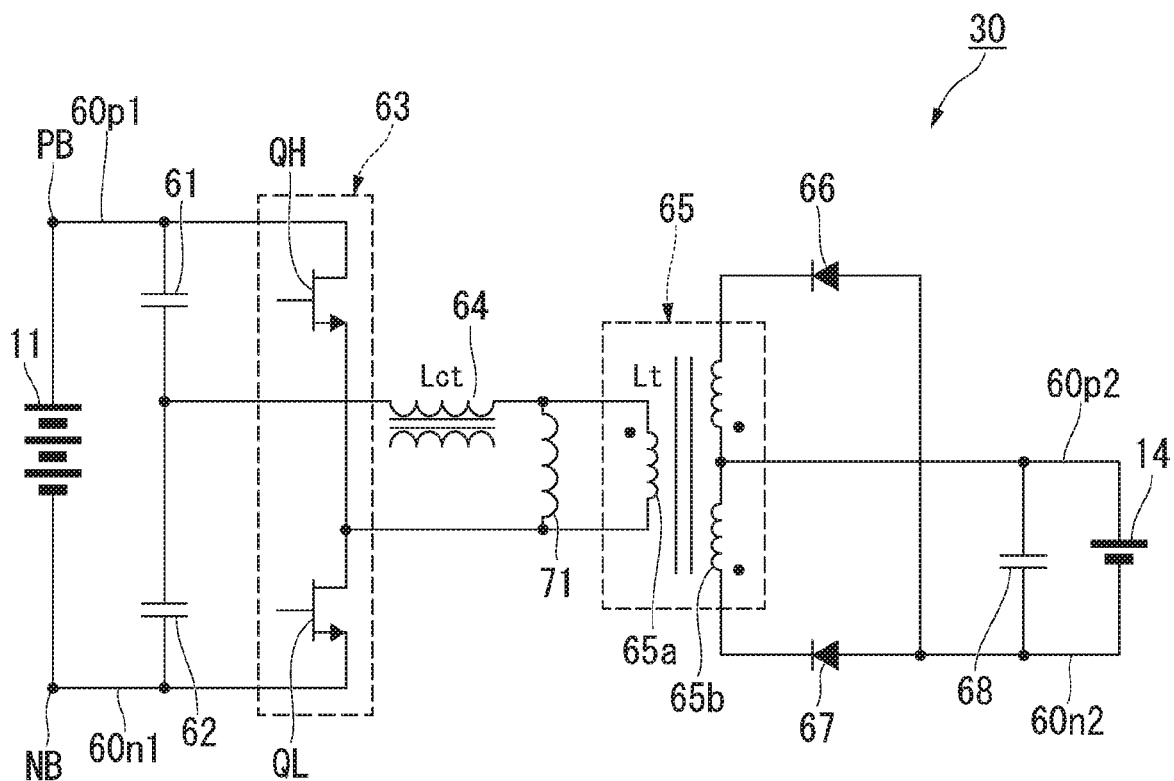
FIG. 6 is a diagram showing a configuration of a DC-DC converter according to a second modified embodiment of the embodiment of the present invention.
Figure 7:
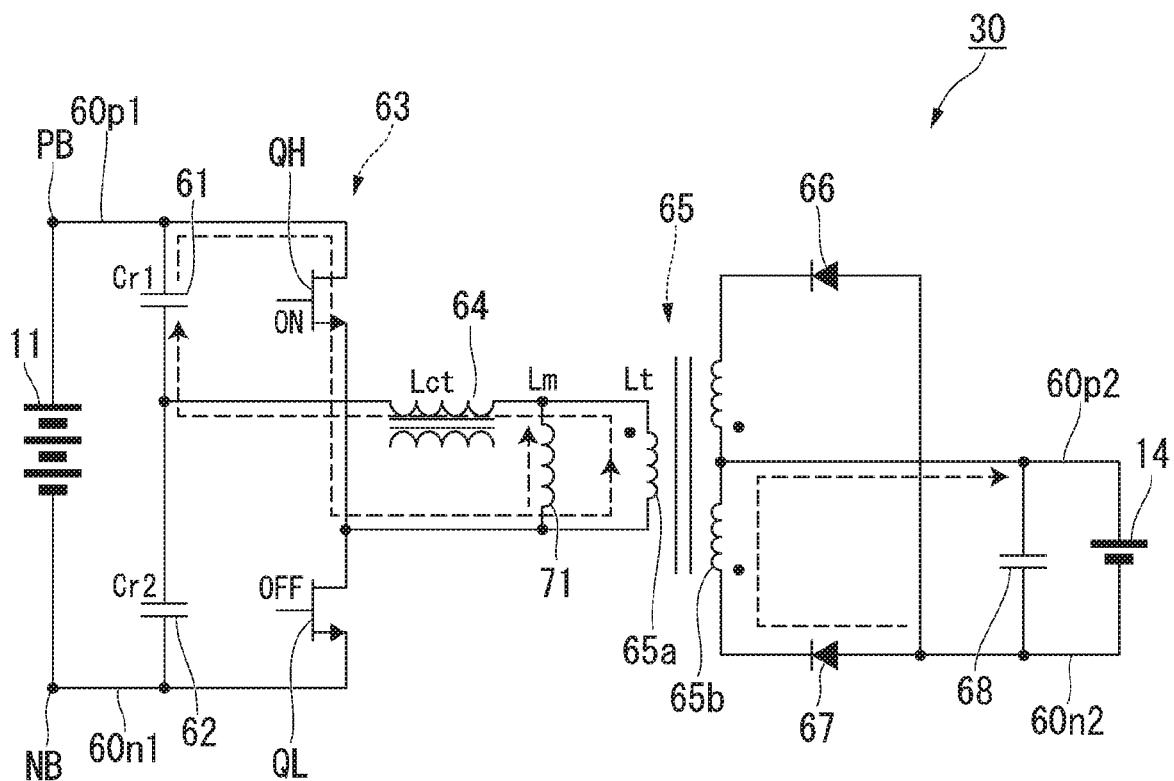
FIG. 7 is a diagram showing an example of the flow of each current on the primary side and the secondary side when the transistor of the high side arm is ON in the DC-DC converter according to the second modification of the embodiment of the present invention.
Figure 8:
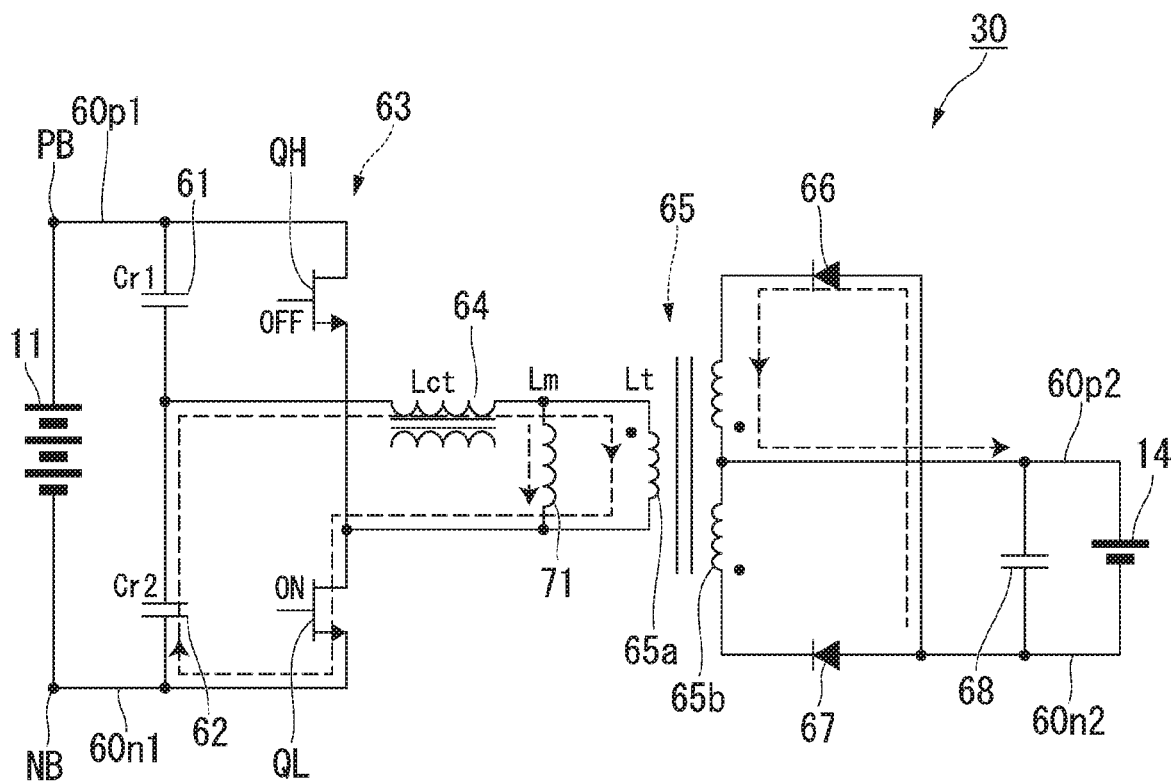
FIG. 8 is a diagram showing an example of the flow of each current on the primary side and the secondary side when the transistor of the low side arm is ON in the DC-DC converter according to the second modification of the embodiment of the present invention.

FIG. 6 is a diagram showing the configuration of a DC-DC converter 30 according to a second modification of the embodiment of the present invention. FIG. 7 shows an example of the flow of each current on the primary side and the secondary side when the transistor QH of the high side arm is on, in the DC-DC converter 30 according to the second modification of the embodiment of the present invention. FIG. 8 is a diagram showing an example of the flow of each current on the primary side and the secondary side when the transistor QL of the low side arm is on, in the DC-DC converter 30 according to the second modification of the embodiment of the present invention.

As shown in FIG. 6, the DC-DC converter 30 according to the second modification of the embodiment described above includes the first input capacitor 61 and the second input capacitor 62, the bridge circuit 63, the current transformer 64, the transformer 65, the first diode 66 and the second diode 67, and the output capacitor 68, which are described above, and further includes an excitation inductor 71.

The excitation inductor 71 is connected in parallel with the primary side coil 65a of the transformer 65 between the connection point of the first input capacitor 61 and the second input capacitor 62 and the connection point of the transistors QH and QL of the high side arm and the low side arm of the bridge circuit 63.

The DC-DC converter 30 of the second modification controls the output voltage by a resonant current flowing in a resonant circuit formed by the respective capacitances Cr1 and Cr2 of the first and second input capacitors 61 and 62, the inductance Lct of the current transformer 64, the leakage inductance Lt of the transformer 65, and the excitation inductance Lmt of the exciting inductor 71.

The electronic control unit 28 is, uses the resonance frequency Fs described by the capacitances Cr1 and Cr2, the inductance Lct of the current transformer 64, the leakage inductance Lt of the transformer 65, and the excitation inductance Lm, for example, as shown in the following equation (4), and controls switching of on (conductive)/off (break) of each transistor QH and QL of the bridge circuit 63. Equation (4) below includes the resonance frequency Fs (QH) on the side of the transistor QH of the high side arm and the resonance frequency Fs (QL) on the side of the transistor QL of the low side arm.

(Equation 4)

$$Fs(QH) = \frac{1}{2\pi\sqrt{\left\{\left(Lct + \frac{(Lm \times Lt)}{(Lm + Lt)}\right) \times Cr1\right\}}}$$

$$Fs(QL) = \frac{1}{2\pi\sqrt{\left\{\left(Lct + \frac{(Lm \times Lt)}{(Lm + Lt)}\right) \times Cr2\right\}}}$$

(4)

According to the second modification, by additionally including the excitation inductor 71, the inductance component for resonance can be set to be in a wider range, and the versatility of the DC-DC converter 30 can be improved.

In the second modification shown in FIG. 6, the inductance component for resonance includes the inductance Lct of the current transformer 64, the leakage inductance Lt of the transformer 65, and the excitation inductance Lm of the excitation inductor 71, but the leakage inductance Lt of the transformer 65 may be omitted. That is, the inductance component for resonance may be configured by the inductance Lct of the current transformer 64 and the excitation inductance Lm of the excitation inductor 71.

In the embodiment described above, the DC-DC converter 30 includes the first diode 66 and the second diode 67 for rectification on the secondary side (that is, the low voltage output side), but the present invention is not limited to this. The DC-DC converter 30 may include, for example, switching elements for synchronous rectification instead of the respective diodes 66 and 67.

Figure 9:
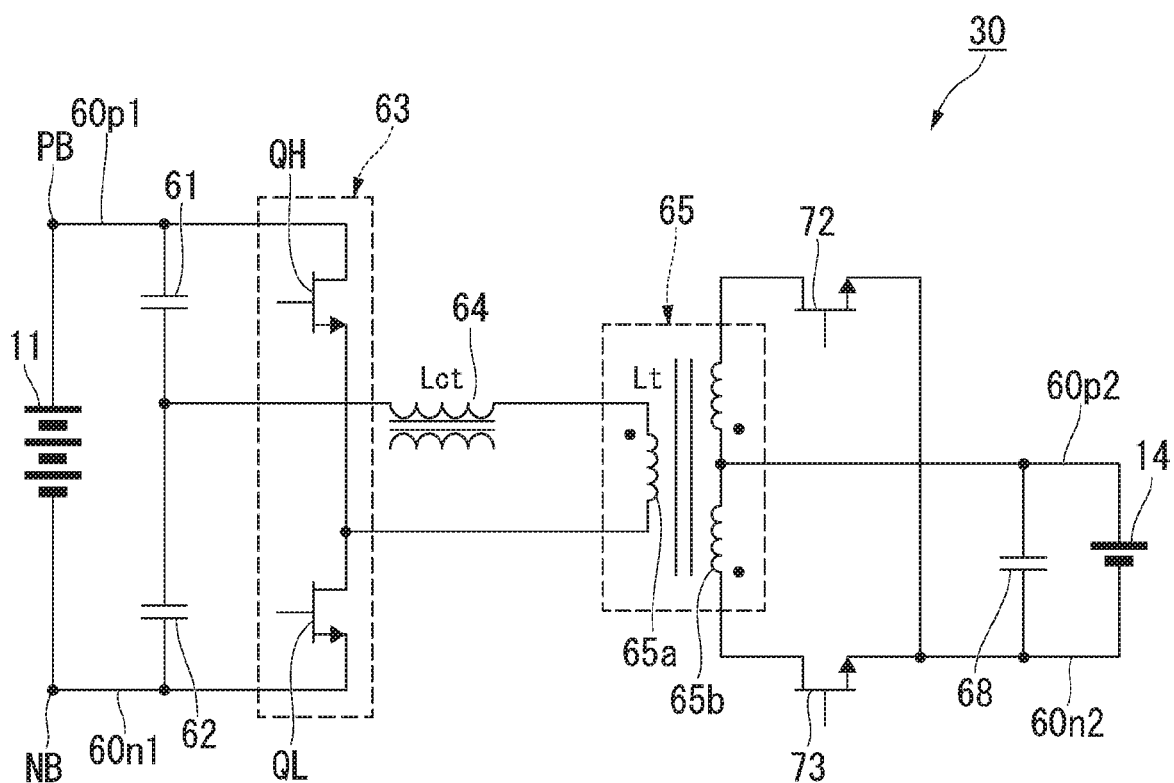
FIG. 9 is a diagram showing the configuration of a DC-DC converter according to a third modification of the embodiment of the present invention.

FIG. 9 is a diagram showing the configuration of a DC-DC converter 30 according to a third modification of the embodiment of the present invention.

As shown in FIG. 9, the DC-DC converter 30 according to the third modification includes a first rectifying transistor 72 and a second rectifying transistor 73 instead of the first diode 66 and the second diode 67 in the above-described embodiment. Each of the first rectification transistor 72 and the second rectification transistor 73 is, for example, a transistor such as a MOSFET. Each of the first rectification transistor 72 and the second rectification transistor 73 is on/off driven in synchronization with the switching of each transistor QH, QL of the high side arm and the low side arm on the primary side.

In the above-described embodiment, the DC-DC converter 30 includes the current transformer 64, but the present invention is not limited to this. The DC-DC converter 30 may include another current sensor having an inductance serving as an inductance component for resonance.

In the embodiment described above, the DC-DC converter 30 controls the on (conductive)/off (break) switching of each of the transistors QH and QL of the bridge circuit 63 by the electronic control unit 28, but the control unit in the DC converter 30 may control switching of each of the transistors QH and QL of the bridge circuit 63.

In the embodiment described above, the DC-DC converter 30 may be incorporated, for example, in the power control unit including the power conversion device 16 or may be disposed outside the power control unit.

In the embodiment described above, the DC-DC converter 30 is mounted on the vehicle 10, but the present invention is not limited to this, and may be mounted on another device.

While preferred embodiments of the invention have been described and illustrated above, it should be understood that these are exemplary examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A voltage conversion device comprising:
   a transformer comprising a primary coil provided on a primary side that is a high voltage side and a secondary coil provided on a secondary side that is a low voltage side;
   a current sensor connected to the primary coil; and
   one or more capacitors connected between the current sensor and a battery,
   wherein
   a resonant circuit is formed on the primary side, the resonant circuit exclusively comprising a capacitance of the one or more capacitors, an inductance of the current sensor, and an inductance of the transformer, and
   a resonance frequency of the resonant circuit is determined based on the inductance of the current sensor.

2. The voltage conversion device according to claim 1, wherein the resonance frequency of the resonant circuit is calculated based on the inductance of the current sensor and a leakage inductance of the transformer.

3. The voltage conversion device according to claim 1, further comprising:
   a rectifying diode provided on the secondary side.

4. The voltage conversion device according to claim 1, further comprising:
   a switching element that performs synchronous rectification provided on the secondary side.

5. The voltage conversion device according to claim 1, wherein the resonance frequency of the resonant circuit is determined based exclusively on the capacitance of the capacitor and the inductance of the current sensor.

\* \* \* \* \*